(12) United States Patent
Jeong et al.

(10) Patent No.: US 12,286,160 B2
(45) Date of Patent: Apr. 29, 2025

(54) STRUCTURE OF PURPOSE-BUILT VEHICLE

(71) Applicants: Hyundai Motor Company, Seoul (KR); Kia Corporation, Seoul (KR)

(72) Inventors: Seung Min Jeong, Hwaseong-si (KR); Hyo Seop Cha, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 375 days.

(21) Appl. No.: 17/897,317

(22) Filed: Aug. 29, 2022

(65) Prior Publication Data
US 2023/0202580 A1    Jun. 29, 2023

(30) Foreign Application Priority Data
Dec. 28, 2021  (KR) .................. 10-2021-0190029

(51) Int. Cl.
*B62D 25/20* (2006.01)
*B60K 1/04* (2019.01)
*B62D 27/02* (2006.01)

(52) U.S. Cl.
CPC ........... *B62D 25/2036* (2013.01); *B60K 1/04* (2013.01); *B62D 27/023* (2013.01); *B60K 2001/0438* (2013.01)

(58) Field of Classification Search
USPC .................................................. 296/187.12
See application file for complete search history.

(56) References Cited

U.S. PATENT DOCUMENTS

| | | | | |
|---|---|---|---|---|
| 5,501,289 | A * | 3/1996 | Nishikawa | B60K 1/04 280/783 |
| 8,292,356 | B2 * | 10/2012 | Ishigame | B60N 2/005 296/193.07 |
| 10,017,037 | B2 * | 7/2018 | Newman | H01M 50/271 |
| 10,099,546 | B2 * | 10/2018 | Hara | B60K 1/04 |
| 11,396,333 | B2 * | 7/2022 | Okamura | B60K 1/04 |
| 11,462,793 | B2 * | 10/2022 | Kagami | B60K 1/04 |
| 11,511,612 | B2 * | 11/2022 | Jeon | B62D 25/20 |
| 11,524,606 | B2 * | 12/2022 | Lee | B62D 25/20 |
| 2013/0192914 | A1 * | 8/2013 | Nakamori | B60L 50/64 180/68.5 |
| 2017/0217296 | A1 * | 8/2017 | Nomura | B62D 21/152 |
| 2021/0245596 | A1 | 8/2021 | Arana et al. | |
| 2022/0144064 | A1 * | 5/2022 | Tatsuwaki | H01M 50/242 |

FOREIGN PATENT DOCUMENTS

| | | | |
|---|---|---|---|
| CN | 215284972 U | * 12/2021 | ............... B60K 1/04 |
| JP | 2020-104750 A | 7/2020 | |
| JP | 2021-160511 A | 10/2021 | |
| KR | 10-2021-0130883 A | 11/2021 | |

* cited by examiner

*Primary Examiner* — Amy R Weisberg
*Assistant Examiner* — Veronica M Shull
(74) *Attorney, Agent, or Firm* — Morgan, Lewis & Bockius LLP

(57) ABSTRACT

A structure of a purpose-built vehicle, includes a vehicle body cross member coupled to a floor panel in a lower side of the floor panel of a vehicle body, a frame including frame side members and a frame cross member and coupled to a lower side of the vehicle body, a plurality of connection brackets located between the vehicle body cross member and the frame cross member, and fastening bolts coupled to the connection brackets while penetrating the frame cross member and a battery casing configured to accommodate a high-voltage battery.

15 Claims, 4 Drawing Sheets

STRUCTURE OF PURPOSE-BUILT VEHICLE

CROSS-REFERENCE TO RELATED APPLICATION

The present application claims priority to Korean Patent Application No. 10-2021-0190029, filed Dec. 28, 2021, the entire contents of which is incorporated herein for all purposes by this reference.

BACKGROUND OF THE PRESENT DISCLOSURE

Field of the Present Disclosure

The present disclosure relates to a technology related to a structure of a purpose-built vehicle (PBV).

DESCRIPTION OF RELATED ART

A purpose-built vehicle (PBV) refers to a vehicle capable of being configured by a combination of a drive module for driving the vehicle and a life module for defining passenger and loading spaces having various shapes in accordance with the market requirements to conform to the market tendency of diversified small-quantity production.

Therefore, there is an advantage in that it is possible to rapidly produce a vehicle, which meets the market requirements, only by changing the life module.

Furthermore, according to the recent tendency toward technologies related to environmentally friendly vehicles, research is being conducted on the technology related to the drive module provided with a high-voltage battery.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a structure of a purpose-built vehicle, which significantly improves safety against a rear collision of a vehicle by ensuring more robust rigidity, more safely protecting an provided high-voltage battery and ensuring performance in easily assembling the high-voltage battery, a drive module, and a life module.

To achieve the above-mentioned object, various aspects of the present disclosure are directed to providing a structure of a purpose-built vehicle, the structure including: a vehicle body cross member coupled to a floor panel in a lower side of the floor panel of a vehicle body; a frame including frame side members and a frame cross member and coupled to the vehicle body in the lower side of the vehicle body; a plurality of connection brackets located between the vehicle body cross member and the frame cross member; fastening bolts coupled to the connection brackets while penetrating the frame cross member and a battery casing configured to accommodate a high-voltage battery.

The frame side members may be elongated in a forward and rearward direction of the vehicle, the frame cross member may be elongated in a transverse direction of the vehicle and connects the frame side members provided at first and second opposite sides, the vehicle body cross member may be elongated in the transverse direction of the vehicle and connect side sills at first and second opposite sides of the vehicle body, and the frame cross member may be provided and aligned with the vehicle body cross member in an upward and downward direction of the vehicle body.

The plurality of connection brackets, the frame cross member, and the vehicle body cross member may define a closed loop.

The closed loop defined by the plurality of connection brackets, the frame cross member, and the vehicle body cross member may define a vertical surface that connects the frame cross member and the vehicle body cross member in the upward and downward direction thereof.

The two connection brackets may be symmetrically provided with respect to a center portion of the vehicle based on the transverse direction, and the two connection brackets, the vehicle body cross member, and the frame cross member may define a single closed loop at a lower side of a center portion of the vehicle body cross member.

An upper end portion of the connection bracket may be coupled to a lower side of the vehicle body cross member by welding.

The frame side members may have local opening portions provided below portions of the frame side members to which the frame cross member is coupled.

Rear battery cross members may be provided at an end portion of the battery casing adjacent to a rear side of the vehicle, and the fastening bolts may be fastened to the connection brackets while penetrating the rear battery cross members.

A column sleeve may be provided in the frame cross member, the fastening bolt is provided to penetrate the column sleeve, the column sleeve may provide rigidity for supporting upper and lower sides of the frame cross member, a weld nut may be provided on an upper surface of the connection bracket, and the fastening bolt may be fastened to the weld nut.

Furthermore, to achieve the above-mentioned object, various aspects of the present disclosure are directed to providing a structure of a purpose-built vehicle, the structure including: a vehicle body cross member provided below a floor panel of a vehicle body and provided in a transverse direction of a vehicle; a frame including a frame cross member aligned with the vehicle body cross member in an upward and downward direction of the vehicle and provided in the transverse direction of the vehicle on the frame provided below the vehicle body; a plurality of connection brackets coupled to a lower side of the vehicle body cross member and connecting the frame cross member to the vehicle body cross member; fastening bolts fastened while sequentially penetrating a rear portion of a battery casing configured to accommodate a high-voltage battery, the frame cross member, and the connection brackets.

The two connection brackets may be provided to be spaced from each other at first and second opposite sides of the vehicle body cross member based on a center portion of the vehicle body cross member.

The vehicle body cross member, the two connection brackets, and the frame cross member coupled to lower sides of the connection brackets may define a single closed loop.

First and second opposite end portions of the vehicle body cross member may be coupled to side sills at two opposite sides of the vehicle body, the frame may include frame side members coupled, in a forward and rearward direction of the vehicle, to first and second opposite end portions of the frame cross member, and the frame side members may have a closed cross-section and include opening portions provided below portions of the frame side members to which the first and second opposite end portions of the frame cross member are coupled.

The frame cross member may be coupled to a portion to which a kickup portion is connected, and the frame side member may begin to bend downward and upwards from the kickup portion.

A rear end portion of the battery casing may have rear battery cross members provided at a rear side of the battery casing and elongated in the transverse direction of the vehicle.

A weld nut may be fixed to the vehicle body cross member, the fastening bolt may be fastened to the weld nut, a column sleeve may be provided in the frame cross member, the fastening bolt may penetrate the column sleeve, and the column sleeve may support upper and lower sides of the frame cross member.

According to an exemplary embodiment of the present disclosure, it is possible to significantly improve safety against a rear collision of the vehicle by ensuring more robust rigidity of the purpose-built vehicle, more safely protecting the provided high-voltage battery and ensuring performance in easily assembling the high-voltage battery, the drive module, and the life module.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
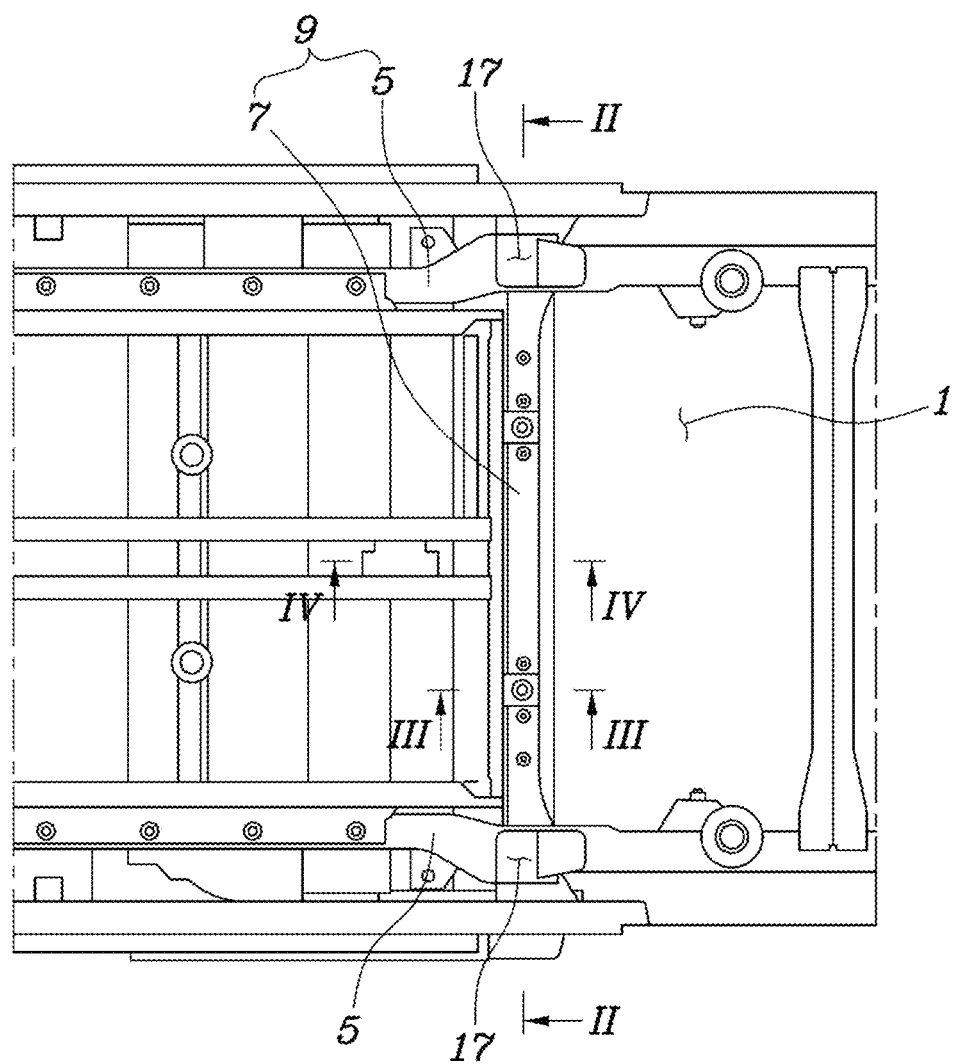
FIG. 1 is a view exemplarily illustrating a structure of a purpose-built vehicle according to an exemplary embodiment of the present disclosure when viewed from a bottom side of a vehicle.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural or functional descriptions of exemplary embodiments of the present disclosure included in the exemplary embodiment or application are exemplified only for explaining the exemplary embodiments according to an exemplary embodiment of the present disclosure, the exemplary embodiments of the present disclosure may be conducted in various forms, and it may not be interpreted that the present disclosure is limited to the exemplary embodiments described in the exemplary embodiment or application.

Because the exemplary embodiments of the present disclosure may be variously changed and may have various forms, specific exemplary embodiments will be illustrated in the drawings and described in detail in the exemplary embodiment or application. However, the descriptions of the specific exemplary embodiments are not intended to limit exemplary embodiments according to the concept of the present disclosure to the specific exemplary embodiments of the present disclosure, but it should be understood that the present disclosure covers all modifications, equivalents and alternatives falling within the spirit and technical scope of the present disclosure.

The terms such as "first" and/or "second" may be used to describe various constituent elements, but these constituent elements should not be limited by these terms. These terms are used only for distinguishing one constituent element from other constituent elements. For example, without departing from the scope according to the concept of the present disclosure, the first constituent element may be referred to as the second constituent element, and similarly, the second constituent element may also be referred to as the first constituent element.

When one constituent element is referred to as being "coupled" or "connected" to another constituent element, it should be understood that one constituent element may be coupled or directly connected to another constituent element, and an intervening constituent element can also be present between the constituent elements. When one constituent element is referred to as being "directly coupled to" or "directly connected to" another constituent element, it should be understood that no intervening constituent element is present between the constituent elements. Other expressions, that is, "between" and "just between" or "adjacent to" and "directly adjacent to", for explaining a relationship between constituent elements, should be interpreted in a similar manner.

The terms used in the present specification are used to just describe a specific embodiment and do not intend to limit the present disclosure. Singular expressions include plural expressions unless clearly referred to as different meanings in the context. In the present specification, it should be understood the terms "comprises," "comprising," "includes," "including," "containing," "has," "having" or other variations thereof are inclusive and therefore specify the presence of stated features, numbers, steps, operations, elements, components, or combinations thereof, but do not preclude the presence or addition of one or more other features, numbers, steps, operations, elements, components, or combinations thereof.

Unless otherwise defined, all terms used herein, including technical or scientific terms, have the same meaning as commonly understood by those skilled in the art to which an exemplary embodiment of the present disclosure pertains.

The terms such as those defined in a commonly used dictionary should be interpreted as including meanings consistent with meanings in the context of related technologies and should not be interpreted as ideal or excessively formal meanings unless explicitly defined in the present specification.

Hereinafter, the present disclosure will be described in detail through DETAILED DESCRIPTION of the present disclosure with reference to the accompanying drawings. Like reference numerals indicated in the respective drawings refer to like members.

Referring to FIG. 1, FIG. 2, FIG. 3, and FIG. 4, a structure of a purpose-built vehicle according to various exemplary embodiments of the present disclosure includes: a vehicle body cross member 3 coupled to a lower side of a floor panel 1 of a vehicle body; a frame 9 including frame side members 5 and a frame cross member 7 and coupled to the vehicle body in the lower side of the vehicle body; a plurality of connection brackets 11 located between the vehicle body cross member 3 and the frame cross member 7; and fastening bolts 15 of the fastening member coupled to the connection brackets 11 while penetrating the frame cross member 7 and a battery casing 13 configured to accommodate a high-voltage battery.

That is, the vehicle body cross member 3, the connection brackets 11, the frame cross member 7, and the battery casing 13 are sequentially provided from above the vehicle, and the battery casing 13 and the frame cross member 7 are coupled to the vehicle body cross member 3 by the connection brackets 11 and the fastening bolts 15.

Therefore, the battery casing 13, the frame cross member 7, the connection brackets 11, and the vehicle body cross member 3 are coupled together only by coupling the fastening bolt 15, ensuring performance in more easily assembling the purpose-built vehicle.

In the instant case, the floor panel 1 and the vehicle body cross member 3 may be the components forming a life module of the purpose-built vehicle, and the frame 9 and the battery casing 13 may be the components forming a drive module of the purpose-built vehicle. The drive module and the life module may be easily coupled by the fastening bolts.

The frame side members 5 are elongated in a forward and rearward direction of the vehicle. The frame cross member 7 is elongated in a transverse direction of the vehicle and connects the frame side members 5 provided at two opposite sides of the vehicle. The vehicle body cross member 3 is elongated in the transverse direction of the vehicle and connects side sills 4 at the two opposite sides of the vehicle body. The frame cross member 7 is provided and aligned with the vehicle body cross member 3 in an upward and downward direction of the vehicle body.

That is, the frame side members 5 and the frame cross member 7 form the frame 9 and coupled to the lower side of the vehicle body. In the instant case, the frame cross member 7 is provided below and aligned with the vehicle body cross member 3 and spaced from the vehicle body cross member 3 in the upward and downward direction thereof.

Figure 2:
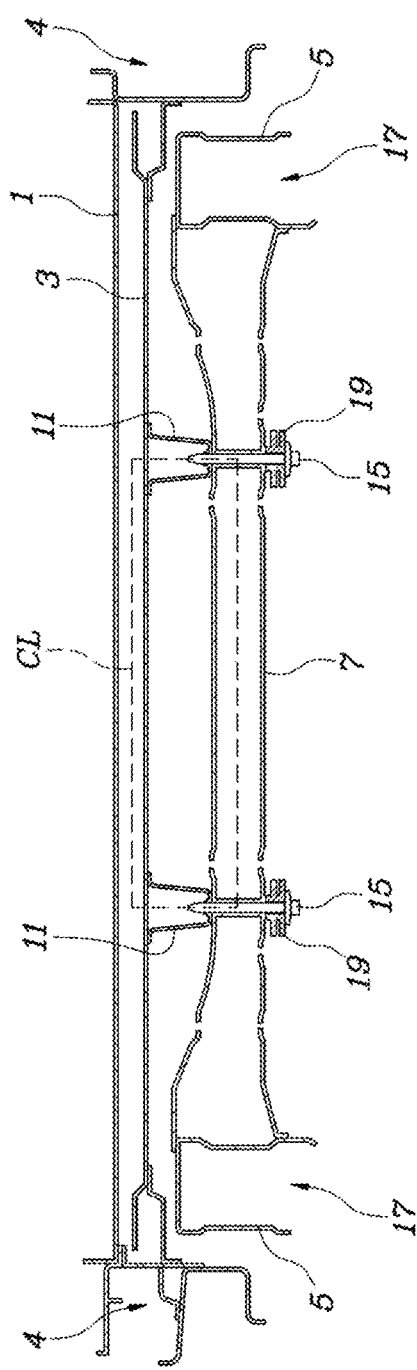
FIG. 2 is a cross-sectional view taken along line II-II in FIG. 1.
Figure 3:
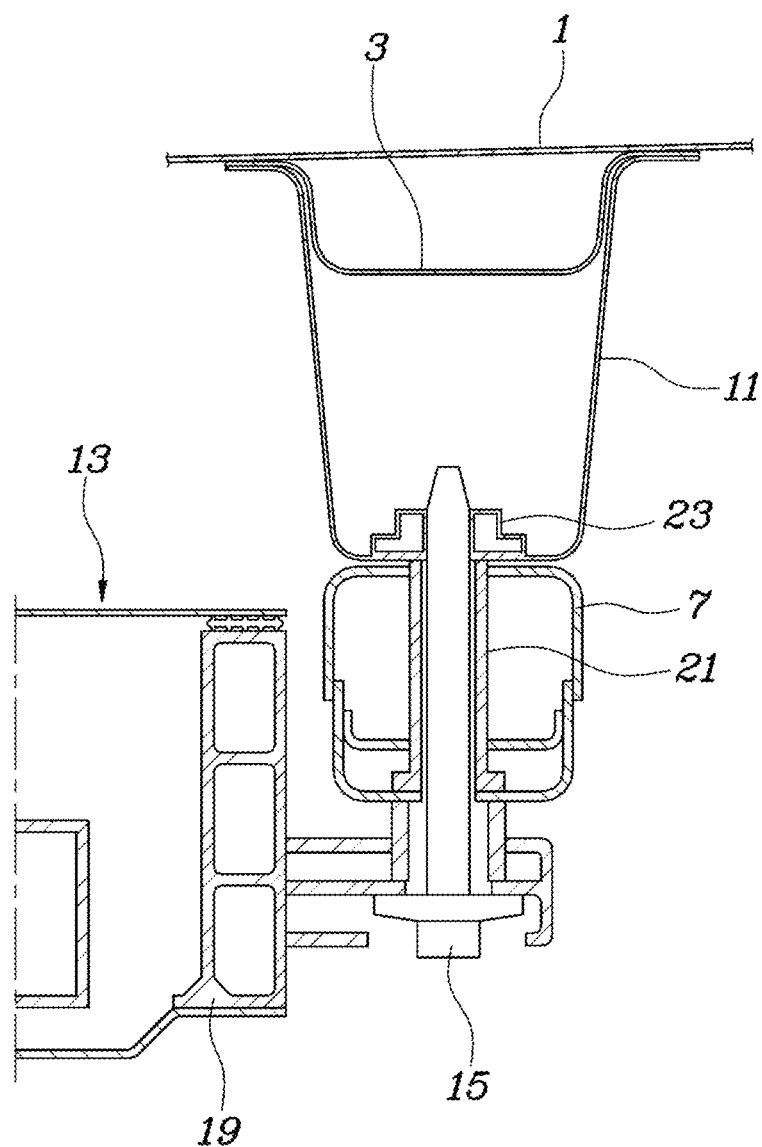
FIG. 3 is a cross-sectional view taken along line in III-III FIG. 1.
Figure 4:
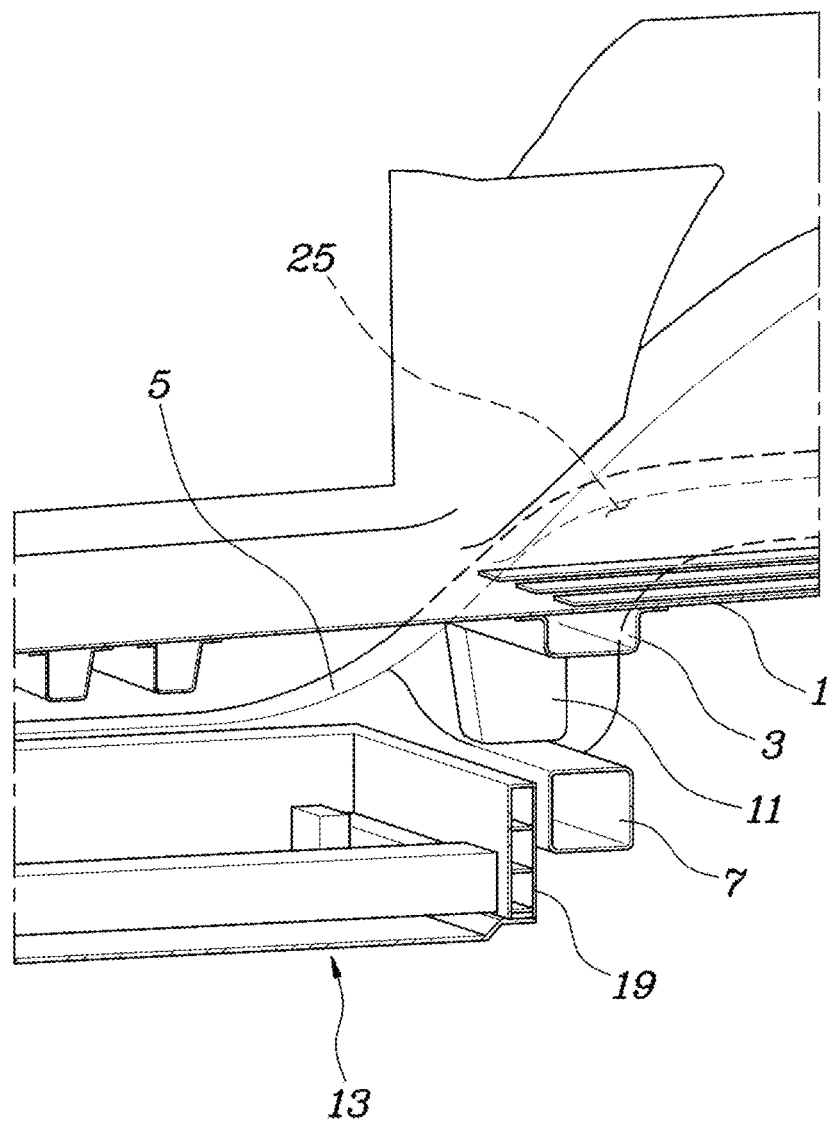
FIG. 4 is a cross-sectional view taken along line IV-IV in FIG. 1.

Therefore, the plurality of connection brackets 11, the frame cross member 7, and the vehicle body cross member 3 may define a closed loop CL illustrated in FIG. 2. The closed loop CL may define a vertical surface that connects the frame cross member 7 and the vehicle body cross member 3 in the upward and downward direction thereof.

Therefore, the frame cross member 7 and the vehicle body cross member 3 may ensure stronger rigidity while defining the closed loop CL by the connection brackets 11. Therefore, it is possible to provide a higher supporting force against external impact such as a rear collision of the vehicle, more safely protecting the high-voltage battery.

In an exemplary embodiment of the present disclosure, the two connection brackets 11 are symmetrically provided with respect to a center portion of the vehicle based on the transverse direction thereof. The two connection brackets 11, the vehicle body cross member 3, and the frame cross member 7 are structured to define the single closed loop CL at a lower side of a center portion of the vehicle body cross member 3.

An upper end portion of the connection bracket 11 may be coupled to the lower side of the vehicle body cross member 3 by welding or the like.

Meanwhile, the frame side members 5 have local opening portions 17 provided below the portions of the frame side members 5 to which the frame cross member 7 is coupled.

A trailing arm, which forms a rear-wheel suspension system, may be coupled to the opening portion 17.

Rear battery cross members 19 are provided at an end portion of the battery casing 13 adjacent to a rear side of the vehicle. The fastening bolt 15 is fastened to the connection bracket 11 while penetrating the rear battery cross member 19.

That is, the battery casing 13 has the rear battery cross members 19 provided at the end portion of the battery casing 13 adjacent to the rear side of the vehicle, and the rear battery cross members 19 are coupled to the frame cross member 7 by the fastening bolts 15 so that a rear side of the battery casing 13 may be securely fixed to the vehicle body.

A column sleeve 21 is provided in the frame cross member 7, and the fastening bolt 15 is provided to penetrate the column sleeve 21 so that the column sleeve 21 provides rigidity for supporting the upper and lower sides of the frame cross member 7. As a result, the battery casing 13 may be more securely fixed by the fastening bolt 15.

Furthermore, a weld nut 23 of the fastening member is provided on an upper surface of the connection bracket 11, and the fastening bolt 15 is fastened to the weld nut 23 so that the fastening bolt 15 may be easily fastened.

The structure of the purpose-built vehicle according to an exemplary embodiment of the present disclosure may also be expressed as follows.

That is, the structure of the purpose-built vehicle according to the exemplary embodiment of the present disclosure includes: the vehicle body cross member 3 provided below the floor panel 1 of the vehicle body and provided in the transverse direction of the vehicle; the frame cross member 7 aligned with the vehicle body cross member 3 in the upward and downward direction and provided in the transverse direction of the vehicle on the frame 9 provided below the vehicle body; the plurality of connection brackets 11 coupled to the lower side of the vehicle body cross member 3 and configured to connect the frame cross member 7 to the vehicle body cross member 3; and the fastening bolts 15 fastened while sequentially penetrating the rear portion of the battery casing 13 configured to accommodate the high-voltage battery, the frame cross member 7, and the connection brackets 11.

The two connection brackets 11 may be provided to be spaced from each other at two opposite sides based on the center portion of the vehicle body cross member 3.

The vehicle body cross member 3, the two connection brackets 11, and the frame cross member 7 coupled to the lower sides of the connection brackets 11 may define the single closed loop CL.

The two opposite end portions of the vehicle body cross member 3 are coupled to the side sills 4 at the two opposite sides of the vehicle body. The frame 9 includes the frame side members 5 coupled, in the forward and rearward direction of the vehicle, to the two opposite end portions of the frame cross member 7. The frame side members 5 may have a closed cross-section and include the opening portions 17 provided below the portions of the frame side members 5 to which the two opposite end portions of the frame cross member 7 are coupled.

The frame cross member 7 may be coupled to a portion to which a kickup portion 25 is connected, and the frame side member 5 begins to bend downward and upwards from the kickup portion 25.

A rear end portion of the battery casing 13 may have the rear battery cross members 19 provided at the rear side of the battery casing 13 and elongated in the transverse direction of the vehicle.

The weld nut 23 is fixed to the vehicle body cross member 3, and the fastening bolt 15 is fastened to the weld nut 23. The column sleeve 21 may be provided in the frame cross member 7, and the fastening bolt 15 is provided to penetrate the column sleeve 21. The column sleeve 21 may support the upper and lower sides of the frame cross member 7.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A structure of a purpose-built vehicle, the structure comprising:
a vehicle body cross member coupled to a floor panel in a lower side of the floor panel of a vehicle body;
a frame including frame side members and a frame cross member and coupled to the vehicle body in the lower side of the vehicle body;
a plurality of connection brackets located between the vehicle body cross member and the frame cross member; and
fastening members coupled to the connection brackets while penetrating the frame cross member and a battery casing configured to accommodate a battery,
wherein the frame side members are elongated in a forward and rearward direction of the vehicle, the frame cross member is elongated in a transverse direction of the vehicle and connects the frame side members provided at first and second opposite sides of the frame cross member,
wherein the vehicle body cross member is elongated in the transverse direction of the vehicle and connects side sills at first and second opposite sides of the vehicle body,
wherein the frame cross member is provided and aligned with the vehicle body cross member in an upward and downward direction of the vehicle body, and
wherein the plurality of connection brackets, the frame cross member, and the vehicle body cross member define a closed section therebetween.

2. The structure of claim 1, wherein the closed section defined by the plurality of connection brackets, the frame cross member, and the vehicle body cross member defines a vertical surface that connects the frame cross member and the vehicle body cross member in the upward and downward direction.

3. The structure of claim 1, wherein two connection brackets among the connection brackets are symmetrically provided with respect to a center portion of the vehicle in the transverse direction.

4. The structure of claim 3, wherein the two connection brackets, the vehicle body cross member, and the frame cross member define a single closed section at a lower side of a center portion of the vehicle body cross member.

5. The structure of claim 1, wherein an upper end portion of the connection brackets is coupled to a lower side of the vehicle body cross member by welding.

6. The structure of claim 1, wherein the frame side members have local opening portions provided below portions of the frame side members to which the frame cross member is coupled.

7. The structure of claim 1, wherein rear battery cross members are provided at an end portion of the battery casing adjacent to a rear side of the vehicle, and the fastening members are fastened to the connection brackets while penetrating the rear battery cross members.

8. The structure of claim 7, wherein a column sleeve is provided in the frame cross member, the fastening members are provided to couple the frame cross member to the connection brackets through the column sleeve.

9. The structure of claim 8, wherein each of the fastening members includes:
a fastening bolt; and
a weld nut,
wherein the fastening bolt is provided to penetrate the column sleeve, the column sleeve provides rigidity for supporting upper and lower sides of the frame cross member, the weld nut is provided on an upper surface of the connection brackets, and the fastening bolt is fastened to the weld nut through the column sleeve.

10. A structure of a purpose-built vehicle, the structure comprising:
a vehicle body cross member provided below a floor panel of a vehicle body and provided in a transverse direction of the vehicle;
a frame including a frame cross member aligned with the vehicle body cross member in an upward and downward direction of the vehicle and provided in the transverse direction of the vehicle;
a plurality of connection brackets coupled to a lower side of the vehicle body cross member and connecting the frame cross member to the vehicle body cross member; and
fastening members fastened while sequentially penetrating a rear portion of a battery casing configured to accommodate a battery, the frame cross member, and the connection brackets, wherein two connection brackets among the connection brackets are provided to be spaced from each other at first and second opposite sides of the vehicle body cross member based on a center portion of the vehicle body cross member, and wherein the vehicle body cross member, the two connection brackets, and the frame cross member coupled to lower sides of the two connection brackets define a single closed section.

11. The structure of claim 10, wherein first and second opposite end portions of the vehicle body cross member are coupled to side sills at first and second opposite sides of the vehicle body, the frame further includes frame side members coupled, in a forward and rearward direction of the vehicle, to first and second opposite end portions of the frame cross member, and the frame side members have a closed cross-section and include opening portions provided below portions of the frame side members to which the first and second opposite end portions of the frame cross member are coupled.

12. The structure of claim 11, wherein the frame cross member is coupled to a portion to which a kickup portion is connected, and the frame side member begins to bend downward and upwards from the kickup portion.

13. The structure of claim 10, wherein a rear end portion of the battery casing has rear battery cross members provided at a rear side of the battery casing and elongated in the transverse direction of the vehicle.

14. The structure of claim 10, wherein a column sleeve is provided in the frame cross member, and the fastening members are provided to couple the frame cross member to the connection brackets through the column sleeve.

15. The structure of claim 14,
wherein each of the fastening members includes:
a fastening bolt; and
a weld nut, and
wherein the weld nut is fixed to the vehicle body cross member, the fastening bolt is provided to penetrate the column sleeve and fastened to the weld nut, and the column sleeve supports upper and lower sides of the frame cross member.

* * * * *